United States Patent [19]

Pfleger

[11] 4,227,463
[45] Oct. 14, 1980

[54] APPARATUS FOR REMOVING AND INSTALLING BATTERIES

[75] Inventor: Robert H. Pfleger, Milwaukee, Wis.

[73] Assignee: Pflow Industries, Inc., Milwaukee, Wis.

[21] Appl. No.: 890,362

[22] Filed: Mar. 27, 1978

[51] Int. Cl.² ............................................. B60D 1/14
[52] U.S. Cl. ..................................... 104/34; 104/48; 104/172 BT; 187/8.59; 198/731; 414/347; 414/518
[58] Field of Search .............. 104/34, 172 B, 172 BT, 104/48, 135, 165; 214/38 BA, 512; 254/2 C; 187/8.59, 8.69, 17; 198/731; 414/347, 518

[56] References Cited

U.S. PATENT DOCUMENTS

| | | | |
|---|---|---|---|
| 1,566,089 | 12/1925 | Harding | 104/34 |
| 2,792,079 | 5/1957 | Gibson | 214/38 BA |
| 2,891,636 | 6/1959 | Krieger et al. | 187/8.59 |
| 3,677,423 | 7/1972 | Tollefsrud et al. | 104/172 B |
| 4,120,411 | 10/1978 | Johnson | 104/34 |

*Primary Examiner*—John J. Love
*Assistant Examiner*—Ross Weaver

*Attorney, Agent, or Firm*—Andrus, Sceales, Starke & Sawall

[57] ABSTRACT

An apparatus for removing and intalling batteries from equipment, such as a lift truck. The apparatus includes a mobile frame and a bed is mounted for vertical movement on the frame so that the bed can be moved to a position at the same level as the floor of the battery compartment in the lift truck. A pair of parallel drive chains are mounted for endless travel on the bed, and a coupling is carried by the chain and is adapted to engage a strap which encircles the base portion of the battery. By operating the chains, the battery can be withdrawn from the vehicle onto the bed, and the unit carrying the battery can then be moved to a recharging area where the battery is pushed from the bed onto a recharging rack. To raise and lower the bed, a floating cylinder unit is located within the upper horizontal frame member and is connected to one side of the bed. The cylinder unit acts in conjunction with a crossover levelling mechanism to raise and lower the bed while maintaining the bed in a level attitude regardless of the position of the load on the bed.

11 Claims, 7 Drawing Figures

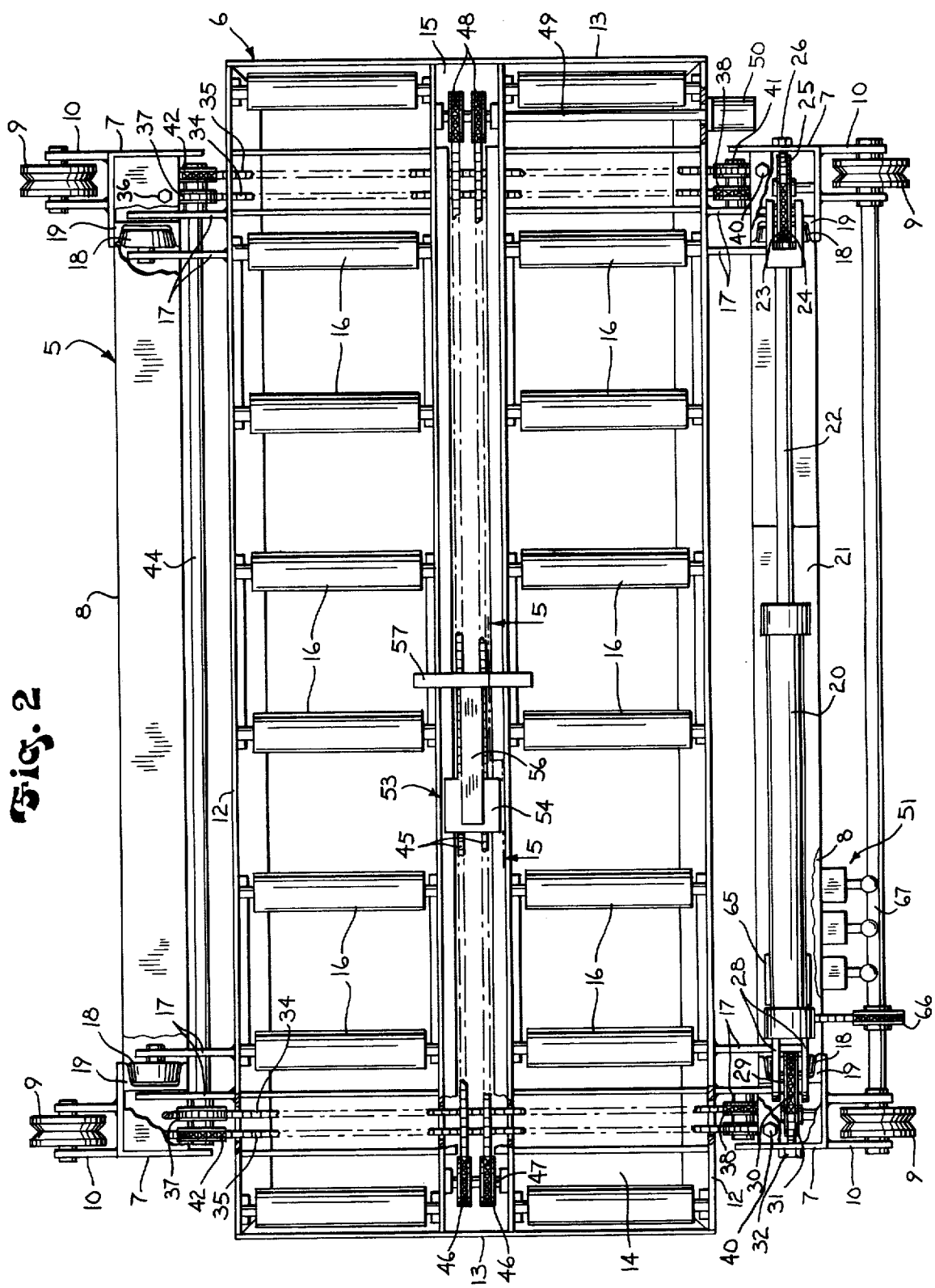

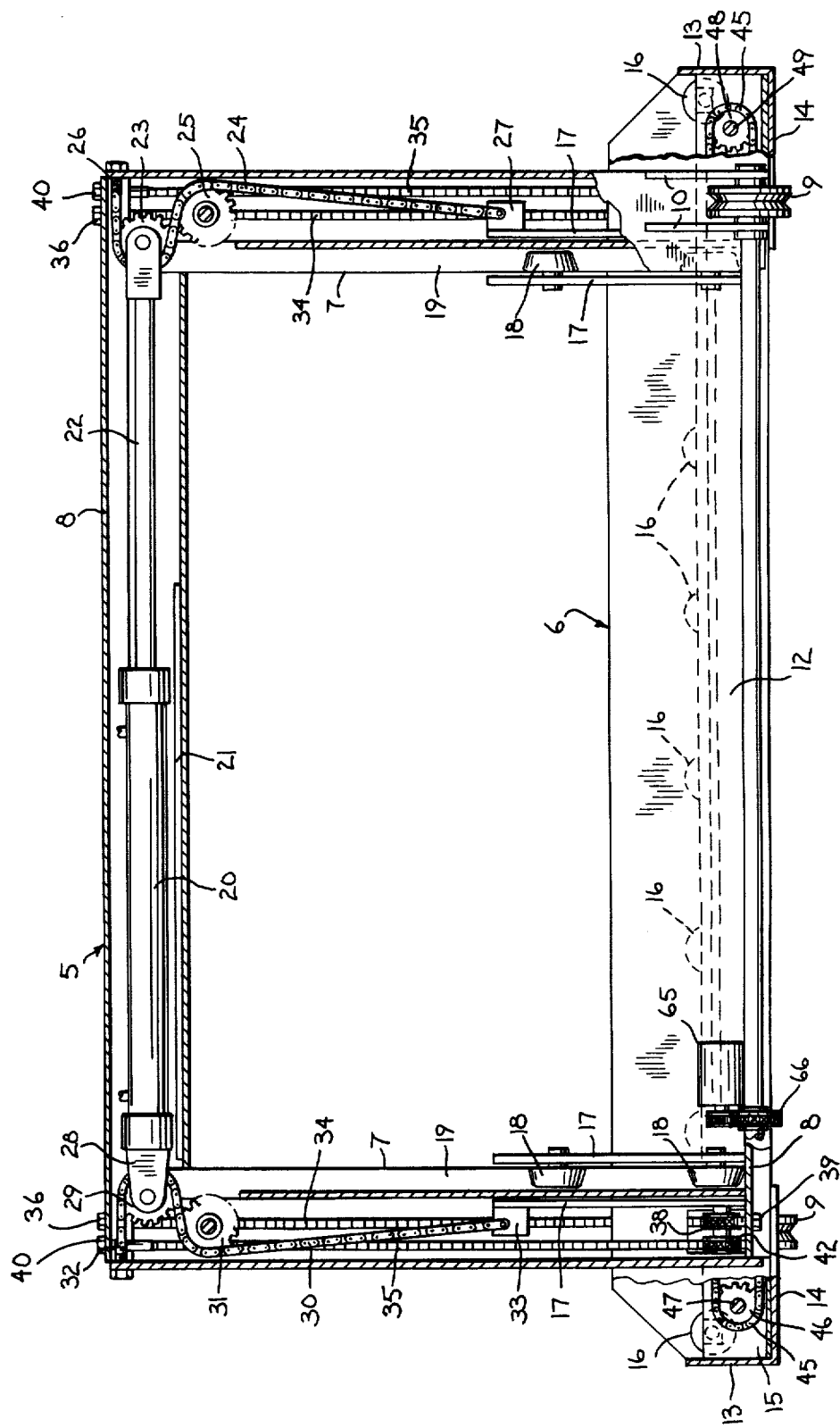

APPARATUS FOR REMOVING AND INSTALLING BATTERIES

BACKGROUND OF THE INVENTION

Recently the use of battery powered industrial material handling equipment, as opposed to internal combustion powered equipment, has increased. The primary reason for this trend is the increased concern about pollution, the increased cost and uncertain supply of LPG and similar fuels, as well as the increased safety inherent in electrical equipment.

The typical battery used in industrial material handling equipment, such as a lift truck, is made up of a multiplicity of lead cell batteries housed in a steel shell. The size, weight and voltage can vary with the power demands of the equipment, but the majority of such batteries will weigh in the range of 1,000 to 6,000 lbs.

Batteries used in mobile material handling equipment normally give 4 to 8 hours of service before requiring recharging Multiple shift operations, therefore, require capability of changing a discharged battery for a fully charged battery to keep the material handling equipment operating. As a normal charging cycle is between 8 to 16 hours, a minimum of three batteries and three battery changes are required to keep the equipment operating on a 24 hours basis.

With single shift operation, the batteries may be charged in the material handling equipment, but as the battery does require maintenance, removal of the battery from the equipment on a periodic basis is still required.

Historically, battery changing has been accomplished with overhead handling equipment, such as a crane, or a lifting beam attached to a lift truck. Overhead handling of the battery has distinct limitations. First, is the capital investment in either the crane or the lift truck. A second limitation is the intrinsic danger in the use of overhead equipment. Usually the battery changing is done by the material handling equipment operator, who is not a skilled crane operator.

Recent trends in the design of material handling equipment have put a premium on compactness of design. This has resulted in the placement of batteries in a location within the material handling equipment which precludes overhead handling of the battery. Thus, removal and replacement of the battery requires that the battery be slid laterally out of the battery compartment and then handled by overhead handling equipment or other means.

Manually operated devices, such as those shown in U.S. Pat. Nos. 3,122,244 and 3,259,365, have been proposed to remove batteries from material handling equipment. More recently, electromagnetic devices have also been used for this purpose. However, all of the battery removing devices, as used in the past, have had certain limitations in either removing the battery from the material handling equipment, or in transporting the battery to and from the recharging station.

SUMMARY OF THE INVENTION

The invention is directed to an improved apparatus for removing and installing batteries in material handling equipment, such as a lift truck. The apparatus of the invention includes a frame having wheels to permit the unit to be moved from the battery removing station to the battery recharging station. A bed is mounted for vertical movement on the frame so that the bed can be positioned at the same level as the floor of the battery compartment in the equipment.

To withdraw the battery from the battery compartment in the material handling equipment, a pair of parallel drive chains are mounted for endless travel on the bed, and a coupling device carried by the chain is engageable with a strap that encircles the base portion of the battery. By driving the chains, the battery will be withdrawn from the battery compartment onto the bed. With the battery supported on the bed, the entire unit is moved on the rails to the recharging station, and the bed can then be adjusted in height so that the battery can be pushed onto the recharging rack. To raise and lower the bed, a floating cylinder mechanism is utilized which is located within an upper horizontal frame member. A chain is connected to the piston rod of the cylinder unit and is dead ended on the bed, while a second chain is connected to the opposite end of the cylinder and is similarly dead-ended on the bed. As the ram or piston rod is retracted and extended, the cylinder will float within the frame member and the bed will be lowered and raised.

A cross levelling mechanism is also provided to maintain the bed in a level attitude as it is raised and lowered. The levelling is accomplished by means of cross-over levelling chains. Two chains on either side of the frame are fixed to the top of that side of the frame and to the bottom of the opposite side of the frame and the bed is suspended between the chains in a manner such that as the bed is moved up and down by the cylinder unit, the bed will be maintained in a level condition at all times.

To facilitate movement of the unit between the battery removing station and the recharging station, the wheels which support the frame can be power driven.

The strap, which encircles the base of the battery and is engaged by the coupling decice is formed of multiple sections and includes an adjusting mechanism to compensate for stretch of the strap during usage.

The apparatus of the invention is a self-contained unit which is capable of withdrawing a battery from the material handling equipment, transporting the battery to a recharging station and discharging the battery onto a recharging rack.

The apparatus includes a novel mechanism for raising and lowering the bed so that the bed can be positioned at the same height as the floor of the battery compartment or at the height of the recharging rack.

The self-levelling mechanism operating in conjunction with the elevating mechanism maintains the bed in a substantially horizontal attitude even though the load may not be evenly distributed on the bed.

The apparatus is capable of being operated by a single workman and this substantially reduces the labor cost in removing and reinstalling batteries, as compared with prior manual methods and semi-automated equipment.

Other objects and advantages appear in the course of the following description.

DESCRIPTION OF THE DRAWINGS

The drawings illustrate the best mode presently contemplated of carrying out the invention.

In the drawings:

FIG. 2 is a top plan view of the apparatus of the invention with parts broken away in section;

FIG. 3 is a side elevation, with parts broken away, showing the bed elevating mechanism;

DESCRIPTION OF THE PREFERRED EMBODIMENT

Figure 1:
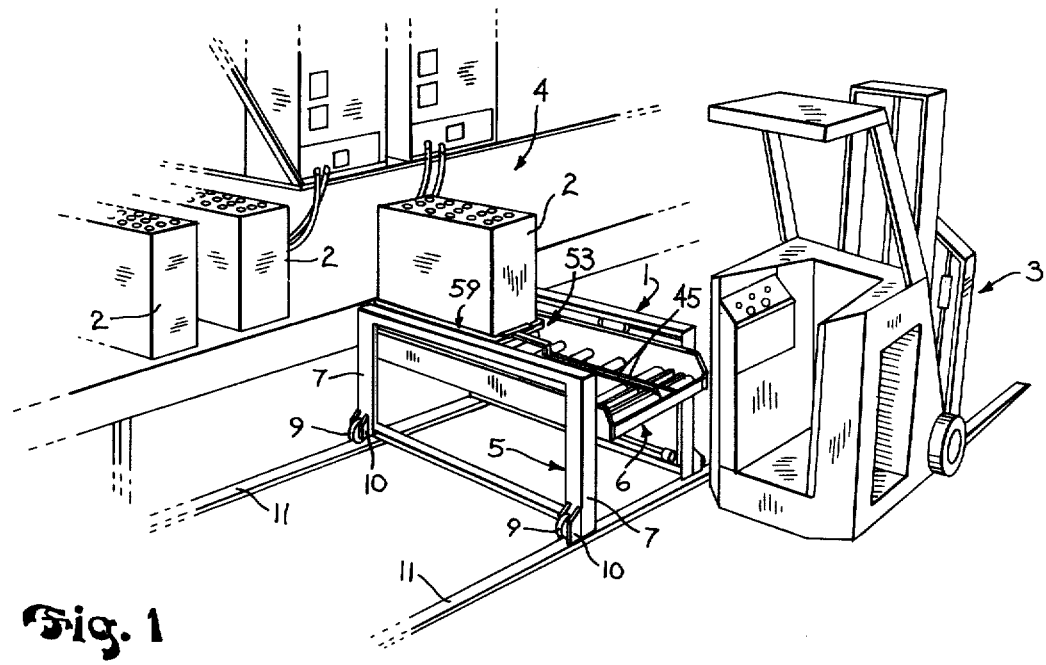
FIG. 1 is a perspective view showing the apparatus of the invention as being used to remove a battery from a lift truck and transfer the battery to a recharging station.

FIG. 1 illustrates a battery removing and installing apparatus 1 to be used in removing a battery 2 from a battery compartment in material handling equipment, such as a lift truck 3. The apparatus 1 is adapted to transfer the battery to a recharging rack 4, where the battery is recharged, and to install a recharged battery in the lift truck 3.

The apparatus 1 includes a frame 5 which carries a bed 6 that is adapted to support the battery 2 when it is removed from the battery compartment of the lift truck. As best illustrated in FIGS. 2 and 3, the frame 5 includes a series of vertical angles 7 and the angles 7 along each side of the frame 5 are connected by upper and lower horizontal beams 8. To provide mobility for the unit, wheels 9 are secured through brackets 10 to the lower end of each of the angles 7.

As shown in FIG. 1, the wheels 9 are grooved and are adapted to ride on generally V-shaped tracks 11 mounted on the foundation or floor of the building so that the apparatus 1 can be moved along the recharging station 4.

To lock the wheels 9 with respect to the track or rails 11, a conventional wheel locking mechanism, not shown, can be associated with each of the wheels 9.

The bed 6 is composed of a pair of side plates 12 which are connected by end plates 13 and bottom plate 14, while a channel 15 is located parallel to, and centrally of side plates 12.

Movement of the battery 2 on and off of the bed 6 is facilitated by a series of rollers 16 which are mounted for rotation between the side plates 12 and respective flanges of channel 15. The upper surfaces of the rollers 16 project slightly above the flanges of channel 15 so that the battery will ride on the rollers as it is moved on the bed.

As previously noted, the bed 6 is adapted to be raised and lowered with respect to the frame 5, and to guide the bed in vertical movement, a pair of parallel plates 17 extend outwardly from each corner of the bed 6, and a pair of rollers 18 are journalled within each pair of plates 17 and ride on vertical guide channels 19 secured to angles 7 to guide the bed 6 in vertical movement with respect to the frame 5.

The mechanism for raising and lowering the bed is best illustrated in FIG. 3 and includes a hydraulic cylinder 20 which is located withone one of the upper horizontal side beams 8. Slide pads 21 are mounted on the lower internal surface of the beam 8 to guide the cylinder 20 in floating movement within the beam.

A piston rod 22 extends outwardly from one end of the cylinder 20 and carries a sprocket 23. Chain 24 is engaged with the sprocket 23, and a second sprocket 25 mounted on upper end of angle 7. One end of the chain 24 is deadended at 26 on beam 8, while the opposite end of the chain is deadended on bracket 27 attached to one of the plates 17 of the bed 6.

Extending outwardly from the opposite end of the cylinder 20 is a pair of lugs 28 which carry a sprocket 29. Chain 30 is engaged with the sprocket 29, as well as sprocket 31 on angle 7, and one end of the chain is deadended on bolt 32 on the frame 5, while the opposite end of the chain 30 is deadended on bracket 33 of bed 6.

FIG. 3 illustrates the position of the cylinder 20 when the bed 6 is in a lowered position. As illustrated in FIG. 3, the cylinder is located within one end of the beam 8 and the piston rod 22 is extended. By introducing hydraulic fluid into the cylinder 20, the piston rod 22 will be retracted and the cylinder will move longitudinally toward the central portion of beam 8, drawing the chains 24 and 30 upwardly to elevate the bed. As the cylinder 20 is free to float with respect to the frame 5, the forces on the two chains 24 and 30 are equalized, which results in a uniform vertical motion of both ends of the bed 6 with respect to the frame.

Figure 4:
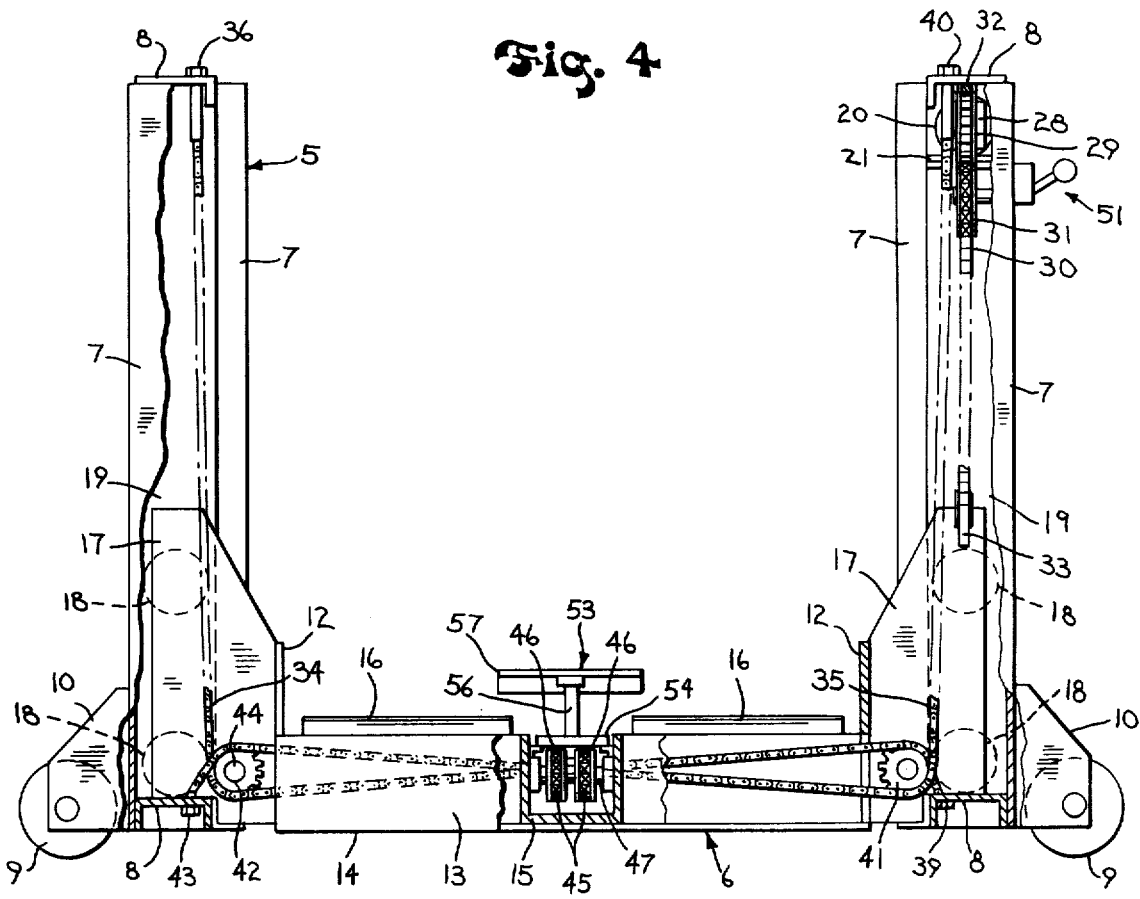
FIG. 4 is an end view with parts broken away, showing the cross-levelling mechanism.

As the bed is unevenly loaded when the battery is in position on either end of the bed, a levelling mechanism is provided to maintain the bed in a horizontal attitude. The levelling mechanism includes a pair of chains 34 and a pair of chains 35 which extend laterally of the frame and support the bed. As shown in FIG. 4, one end of each chain 34 is connected to an adjustable stud 36 mounted in the upper end of one of the vertical columns 7, along one side of the frame. Each chain 34 passes over sprockets 37 and 38, which are mounted on the bed 6, and is deadended at 39 on the lower end of a column 7 at opposite side of the frame. Similarly, one end of each chain 35 is connected to an adjustable stud 40 mounted in the upper end of one of the columns 7 and each chain 35 passes transversely over sprockets 41 and 42 that are carried by the bed. Each chain is anchored at 43 on the lower end of a column. Sprockets 37 and 42 are mounted on a common shaft 44 that extends longitudinally the length of the bed.

With this construction, the bed 6 is suspended between the cross-over chains 34 and 35 in a manner which permits the bed to move vertically, but maintains the bed in a horizontal attitude at all times.

The mechanism to remove the battery 2 from the battery compartment includes a pair of drive chains 45 which are disposed in generally parallel relation within channels 15 of bed 6. Chains 45 are engaged with idler sprockets 46 carried by shaft 47 at one end of the bed, and the chains are also engaged-with drive sprockets 48 mounted on shaft 49 at the opposite end of the bed. Power is supplied to the shaft 49 to drive the chain by hydraulic motor 50, which is mounted on the end of the bed.

The hydraulic control mechanism, indicated generally by 51, can be conveniently mounted on one of the horizontal beams 8 of the frame 5. The control mechanism is a conventional type and includes a pump, reservoir and suitable valve controls which can be operated by the operator to supply hydraulic fluid to the motor 50 and cylinder 20.

Figure 5:
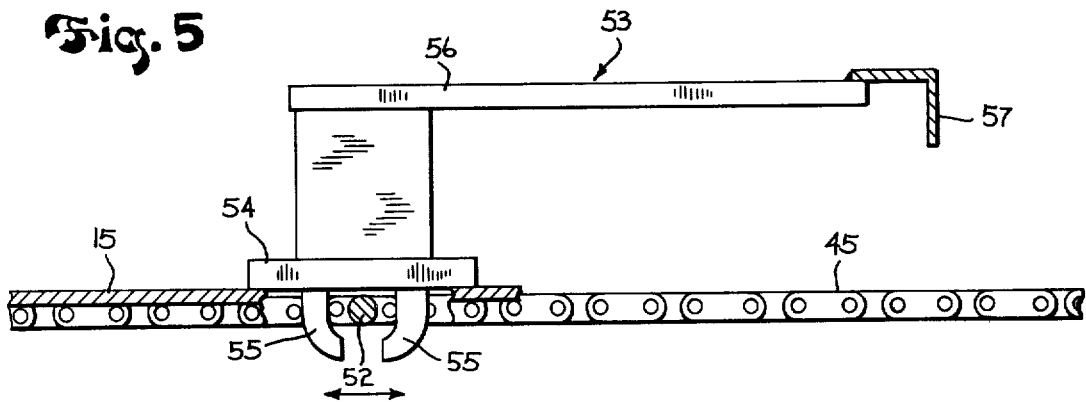
FIG. 5 is a section taken along line 5—5 of FIG. 2.

Connected between the chains 45 is a cross bar 52 which is adapted to be engaged by a coupling device 53. As shown in FIG. 5, the coupling device 53 includes a base plate 54 which rests on the upper flanges of the channel 15, and a pair of feet 55 extend downwardly from the base plate and straddle the cross bar 52. With this connection, movement of the chains 45 and cross bar 52 will correspondingly move the coupling device 53.

A generally L-shaped arm 56 is attached to the upper surface of base plate 54 and the outer extremity of the arm is provided with a hook 57 which is received within a slot 58 in a strap 59 that encircles the lower portion of the battery 2.

Figure 6:
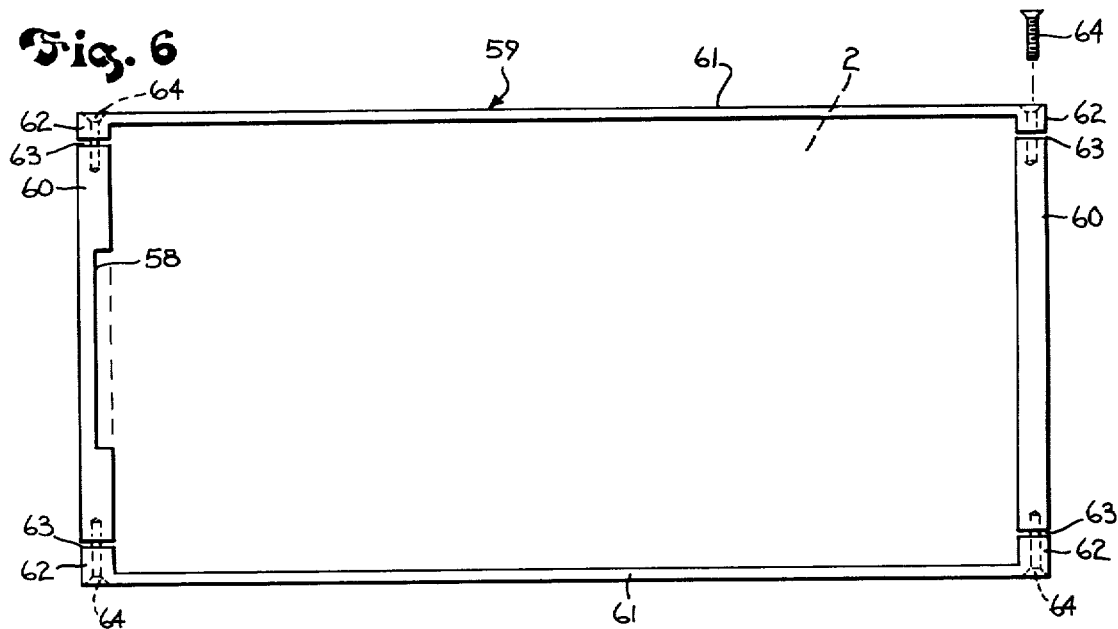
FIG. 6 is a horizontal section showing the strap which encircles the battery.
Figure 7:
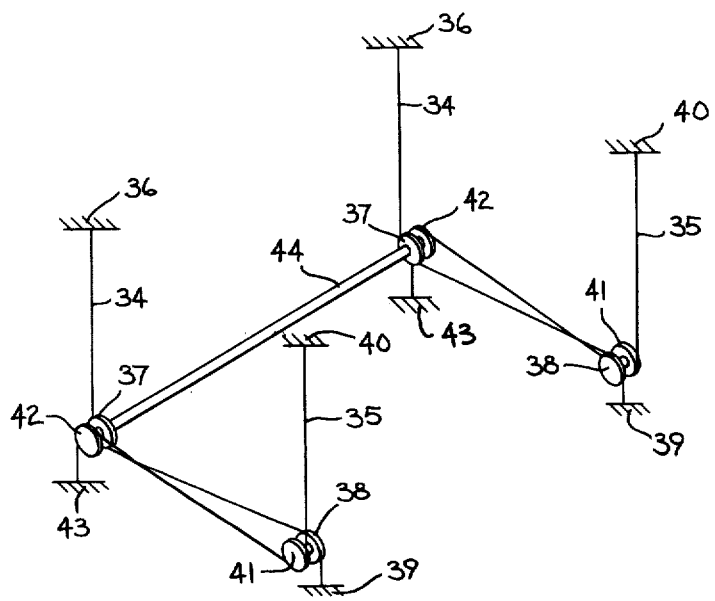
FIG. 7 is a schematic view of the cross-levelling chains.

As best illustrated in FIG. 6, the strap 59 is composed of a pair of end bars 60 and a pair of side sections 61. The ends of the side sections 61 are provided with inwardly extending ears 62 which are spaced from the corresponding ends of bars 60 to provide a slight gap 63. Screws 64 extend through holes in the ears 62 and are threaded into the ends of the bars 60.

Because of the substantial weight of the battery 2, which can be in the range of 1,000 to 6,000 lbs., there will normally be some stretch or deformation in the strap 59 as the battery is pulled from the battery compartment onto the bed 6. However, the sectionalized construction of the strap 59 along with the spacing 63, enables the strap to be periodically tightened about the battery to compensate for any stretch. Without this adjustment the encircling strap could stretch and could become disengaged from the battery.

The invention also includes a provision for driving the apparatus 1 on the rails 11, to enable the battery to be positioned along the recharging area. This drive mechanism includes hydraulic motor 65 which is mounted on a horizontal beam 8 that extends between the lower ends of a pair of columns 7 along one side of frame 5. Motor 65 is connected through a chain drive 66 to a shaft 67 which carries two of the wheels 9. Through operation of the motor 65, the shaft 67 and wheels 9 will be driven to move the apparatus on the rails 11.

To remove a battery 2 from the battery compartment of material handling equipment, the bed 6 is initially elevated by operation of cylinder 20 until the bed is flush with the floor of the battery compartment. The hook 57 of coupler 52 is then inserted within slot 58 of strap 59 on the battery and the chain drive 45 is operated to position the cross bar 52 at a location where the feet 55 of the coupler can engage the bar. With the coupler 52 engaged with the chains 45, the chain drive is then operated to pull the battery from the battery compartment onto the bed 6.

After removal of the battery, the apparatus 1 can be moved on the rails 11 along the recharging area 4 by operation of motor 65. Bed 6 is then raised or lowered until the bed 6 is level with the recharging rack and the chain drive is operated in the opposite direction to push the battery from the bed onto the rack.

The procedure is reversed for removing a recharged battery from the recharging rack and installing the recharged battery in the material handling equipment.

As the coupling device 53 is a rigid member and is removably connected to the cross bar 52 on drive chains 45, it can be operated to exert a force in either direction, allowing the battery to be either pulled or pushed along the bed at either end. This allows great flexibility in the layout of the recharging station and the positioning of the vehicle to be serviced.

The floating cylinder mechanism, which is employed to raise and lower the bed, permits the bed to be dropped to a very low level as compared to scissor-type devices or other mechanisms which have the operating structure located beneath the bed. Due to the fact that the chains 24 and 30 are doubled back around the sprockets on either end of the cylinder, a mechanical advantage is achieved which enables the bed to be elevated and lowered with a lower power requirement, and because of the floating action of the cylinder 20, the load is balanced at all times during the operation.

The cross chain levelling mechanism which supports the bed acts in conjunction with the floating cylinder structure to maintain the bed in a horizontal attitude at all times as the bed is moved, regardless of the weight distribution on the bed.

The apparatus of the invention is designed to facilitate removal or servicing of industrial batteries, and is capable of handling the task with greater speed, greater safety, using less space and at a lower investment cost than prior types of battery removal devices.

Various modes of carrying out the invention are contemplated as being within the scope of the following claims particularly pointing out and distinctly claiming he subject matter which is regarded as the invention.

I claim:

1. An apparatus for removing an article from a compartment, comprising a supporting frame, a bed mounted on the frame and having a surface to support the article in longitudinal movement, elevating means for moving the bed vertically relative to the frame to position the bed substantially flush with the bottom of the compartment, chain drive means mounted for movement in a longitudinal direction on the bed, and coupling means including a rigid arm removably connected to the chain drive means and extending longitudinally of the bed, means for mounting the arm for vertical removal from said chain drive means, whereby said arm can be connected at any location on the drive chain means, said coupling means including a downwardly extending coupling member connected to the outer end of the arm, said arm being movable to a position longitudinally beyond the bed to enable the coupling member to engage an abutment on an article located within the compartment, operation of said drive means in one direction acting to pull the article from the compartment and operation of the drive means in the opposite direction acting to push the article into the compartment.

2. The apparatus of claim 1, wherein said drive means includes a pair of generally parallel chains and a cross member connecting said chains, said arm connected to said cross member.

3. An apparatus for removing an article from a compartment, comprising a supporting frame, a bed mounted on the frame and having a surface to support the article in longitudinal movement, elevating means for moving the bed vertically relative to the frame to position the bed substantially flush with the bottom of the compartment, chain drive means mounted for movement in the longitudinal direction on the bed and located beneath said surface of the bed, and coupling means to connect the chain drive means to the article whereby movement of the chain drive means acts to move the article from the compartment onto said bed, said chain drive means including a pair of generally parallel chains and a cross member connecting said chains, said coupling means including an arm having a pair of spaced feet disposed to straddle said cross member, engagement of said feet with said cross member providing a removable connection between the coupling means and the chain drive means.

4. The apparatus of claim 3, wherein said arm is located at a level above said chains, said coupling member being disposed on the outer extremity of said arm and defining a hook to engage the article.

5. The apparatus of claim 1, wherein said article comprises a battery, and said apparatus includes a strap encircling said battery, said coupling member is disposed to engage said strap.

6. The apparatus of claim 5, wherein said strap is provided with a slot and said coupling member defines a hook to engage the slot.

7. An apparatus for removing an article from a compartment, comprising a supporting frame, a bed mounted on the frame and having a surface to support the article, elevating means for moving the bed vertically relative to the frame to position the bed substantially flush with the bottom of the compartment, drive means mounted for movement in a longitudinal direction on the bed, and coupling means connected to the drive means and adapted to be attached to the article, movement of the chain in one direction acting to pull the article from the compartment and operation of the drive means in the opposite direction acting to push the article into the compartment, said elevating means including a cylinder mounted for free movement with respect to the frame, a piston rod extending from one end of said cylinder, a first flexible member operably connected to said piston rod, one end of said first flexible member being connected to said frame and the opposite end of said first flexible member being connected to said bed, a second flexible member connected to the opposite end of said cylinder, one end of said second flexible member being connected to said frame and the opposite end of said second flexible member being connected to said bed, extension and retraction of said piston rod causing said cylinder to move relative to the frame to thereby operate said flexible members to raise and lower the bed relative to the frame.

8. The apparatus of claim 7, wherein said frame includes an upper horizontal frame member, said cylinder being disposed within said frame member.

9. The apparatus of claim 10, wherein said frame also includes a pair of vertical legs to support said horizontal frame member, said first flexible member extending within one of said legs and the second flexible member extending within the other of said legs.

10. An apparatus for removing and reinstalling batteries from a compartment, comprising a supporting frame, a bed mounted on the frame and having an upper surface to support the battery, means for mounting the bed for vertical movement with respect to said frame, a fluid cylinder mounted for free movement on said frame, a piston rod extending from one end of said fluid cylinder, a first flexible member guided for movement on the end of the piston rod, one end of said first flexible member being connected to said frame and the opposite end of the first flexible member being connected to the bed, a second flexible member guided for movement on the opposite end of the cylinder, one end of said second flexible member being connected to the frame and the opposite end of the second flexible member being connected to the bed, retraction and extension of said piston rod causing said cylinder to move relative to said frame and acting to operate said flexible members to raise and lower said bed relative to the frame, drive means mounted on the bed, and coupling means operably connected to the drive means and disposed to be attached to the battery, whereby operation of said drive means will move said battery relative to said compartment.

11. The apparatus of claim 10, wherein said first and second flexible members are chains and said apparatus includes a sprocket connected to the outer end of the piston rod and engaged with said first flexible member and said apparatus includes a second sprocket connected to the opposite end of the cylinder and engaged with said second flexible member.

* * * * *